United States Patent [19]

Cesca et al.

[11] 3,903,061

[45] Sept. 2, 1975

[54] OLEFIN TETRAPOLYMERS AND PROCESS FOR THE PREPARATION THEREOF

[75] Inventors: Sebastiano Cesca; Giuseppe Ghetti; Eugenio Vajna; Mario Bruzzone; Ermanno Cinelli, all of San Donato Milanese, Italy

[73] Assignee: Snam Progetti S.p.A., San Donato Milanese, Italy

[22] Filed: June 12, 1973

[21] Appl. No.: 369,183

[30] Foreign Application Priority Data

June 21, 1972 Italy.................................. 25983/72

[52] U.S. Cl............................ 260/80.78; 260/80.7
[51] Int. Cl.......................... C08f 17/00; C08f 1/34
[58] Field of Search....................... 260/80.78, 80.7

[56] References Cited
UNITED STATES PATENTS 3,470,138  9/1969  Marconi et al. ................. 260/80.78
3,647,767  5/1972  Cesca et al. ....................... 260/80.7

Primary Examiner—Joseph L. Schofer
Assistant Examiner—A. L. Clingman
Attorney, Agent, or Firm—Ralph M. Watson, Esq.

[57] ABSTRACT

Vulcanizable olefin tetrapolymers are described which are comprised of ethylene, an alpha-olefin having at least three carbon atoms, at least one conventional terpolymer such as endo- and exo-dicyclopentadiene, and a minor amount of a polycyclic polyene represented by the formula A—$(CH_2)_n$—B, wherein A is a radical consisting of or containing at least one cyclohexane ring with or without an endomethylene bridge, B is a cyclodiene radical and $n$ is a number ranging from 0 to 5.

8 Claims, No Drawings

OLEFIN TETRAPOLYMERS AND PROCESS FOR THE PREPARATION THEREOF

The present invention relates to novel olefin tetrapolymers consisting of ethylene, an alpha-olefin, one or more termonomers generally employed in the terpolymer synthesis and a minor amount of a polyene having at least two conjugated double bonds and at least a norbornene ring.

The production of olefin terpolymers containing in their molecule double bonds which are free for the subsequent vulcanization with sulphur base conventional agents is known.

However it is also known the vulcanization rate of these terpolymers is rather low with respect to that of the diene elastomers as, for instance, natural rubber, polyisoprene, polybutadiene, butadiene-styrene, butadiene-isoprene copolymers and the like, and such a negative characteristic has till now hindered the utilization of these terpolymers for mixes with the diene elastomers.

The possibility of having covulcanizable mixes constituted by a terpolymer having a low unsaturation degree and a diene polymer or copolymer would be very useful in the tire industry owing to the fact that the presence of a low unsaturation polymer increases the stability of the manufactured article against ageing and with respect to the oxidising agents.

For this purpose the production of terpolymers has been proposed containing high concentrations of usual termonomers up to 18%. However, without taking into account the complications of the polymerization process (high catalyst consumption, reagent loss because of secondary reactions), terpolymers are obtained showing poor general mechanical properties because of the high glass transition paint of the obtained elastomer and furthermore the peculiar characteristics of the low unsaturation elastomers are remarkably decreased such as the resistance to ageing and oxidizing agents.

In order to avoid the aforesaid troubles, there are disclosed, in Italian Pat. No. 851,631, particular terpolymers containing, as comonomers besides ethylene and propylene or an alpha-olefin, a polycyclic polyene having the general formula A — $(CH_2)_n$ — B wherein A is a radical constituted by or comprising at least one cyclohexene ring with or without an endomethylene bridge, B is a cyclodiene radical and n is a number ranging from 0 to 5.

These terpolymers show very good characteristics as to the vulcanization rate and the covulcanization with diene elastomers also at low concentrations of polyene termonomer. However the cost of these termonomers is higher than that of the conventional termonomer such as dicyclopentadiene, 1,4-hexadiene, cyclooctadiene, tetrahydroindene, vinylcyclohexene, and so on, which may be easily prepared from starting materials easily available.

It has now been suprisingly found that if a copolymerization is performed among ethylene, an alpha-olefin having at least three carbon atoms, a termonomer usually utilized in preparing terpolymers, in the presence of small amounts of a polycyclic polyene as aforesaid, a polymer is obtained showing both the advantages of the very good characteristics of vulcanization and co-vulcanization rate with diene elastomers and the low cost of the traditional termonomers, and the obtained copolymers maintain the characteristics of the low unsaturation elastomers, as regards resistance to ageing and oxidising agents and the glass transition temperature.

This fact is the more surprising in that, if terpolymers are prepared having conventional termonomer amounts equal to or higher than the sum of the inventive termonomers the same results are not obtained with respect to the high vulcanization rate and the co-vulcanization with diene elastomers.

Also the employment of a mix constituted by different terpolymers, the former containing a conventional termonomer and the latter a polycyclic polyene as aforesaid, does not give the characteristics of the inventive tetrapolymer.

Therefore the first subject of the present invention consists of a tetrapolymer both showing the good characteristics of a low unsaturation degree elastomer such as the conventional terpolymers and able to give rise to mixes covulcanizable with rubbers having high unsaturation.

The second subject of the present invention is constituted by the covulcanizable mixes formed by a tetrapolymer as aforesaid and a conventional unsaturated rubber such as natural rubber, polybutadiene, polyisoprene, butadiene-isoprene, butadiene-acrylonitrile and butadiene-styrene copolymers.

Among the so-called commercial termonomers, mention may be made of the following ones: exo and endo-dicyclopentadiene, alkenyl- or cycloalkenilnorbornenes, alkyliden-norbornenes, alkyl-norbornadienes, tetrahydroindene and alkyl derivatives thereof, methyl-endomethylene-hexaydronaphtalene, dicycloheptadiene; non conjugated linear or branched dienes such as 1,4-hexadiene, 1,4-heptadiene, 1,6-octadiene, 1,9-octadecadiene, 11-methyl-dodecadiene-1,10; cyclic dienes such as 1,5-cyclooctadiene, 2-methyl-1,5-cyclooctadiene, cycloheptadiene-1,4; vinyl substituted cyclic hydrocarbons such as vinyl-cyclohexene, vinyl-cyclopentene, dipentene, divinyl-benzene, tri-vinyl-cyclohexane.

The polycyclic polyene which may be advantageously employed in the inventive tetrapolymer corresponds, as aforesaid, to the formula A — $(CH_2)_n$ — B.

In this formula the radical A may be selected from

 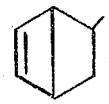 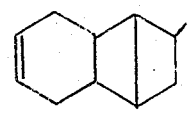 

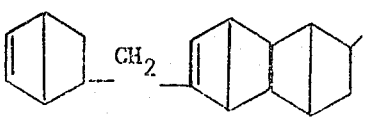 

The radical B may be selected from the following ones:

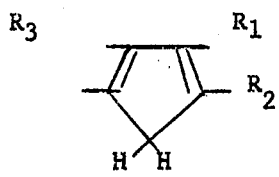 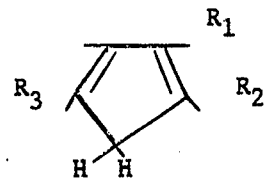 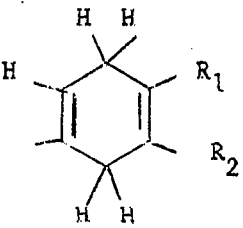 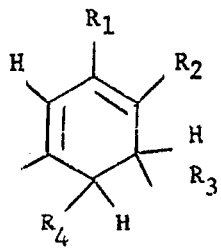

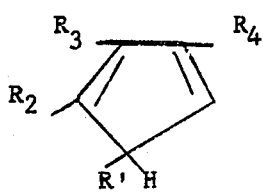 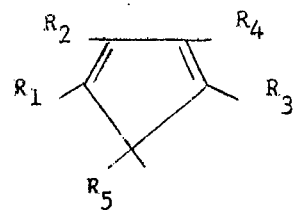

wherein $R_1$ $R_2$ $R_3$ and $R_4$ may be hydrogen or alkyl radical having from 1 to 5 carbon atoms.

Examples of these termonomers are the following ones:

(a) 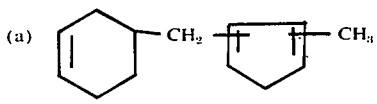 4-cyclohexenyl- [1' or 4' or 5' -(1' or 2' or 3'-methyl)-cyclopentadienyl]-methane (b) 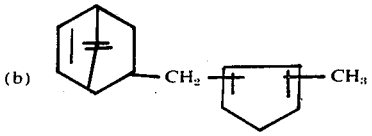 (2-norborn-5-enyl)-[4' or 5' -(2' or 3'-methyl)-cyclopentadienyl]methane (c) 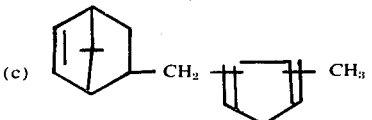 (2-norborn-5-enyl)-[4' or 5'-(1',2' or 3' dimethyl)-cyclopentadienyl]-methane (d) 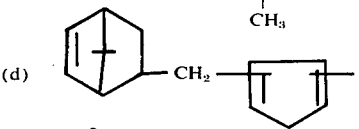 (2-norborn-5-enyl)-(4' or 5' cyclopentadienyl)-methane (e) 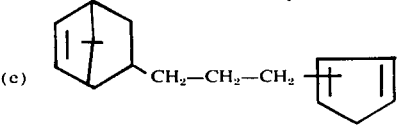 1''-(2-norborn-5-enyl)-3''-(4' or 5'-cyclopentadienyl)-propane (f) 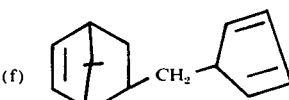 (2-norborn-5-enyl)-(1'-cyclopentadienyl)-methane (g) 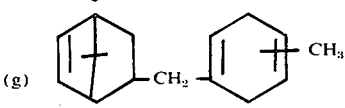 (2-norborn-5-enyl)-[6'-(2' or 3' -methyl)-cyclohexadienyl-2',5']-methane (h) 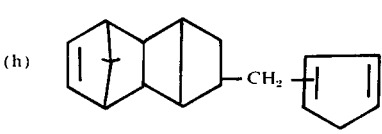 [bis-(1,4 - 5,8-endomethylene)-7-(1,4,5,6,7,8 9,10-octahydro)-naphthalenyl]-(4' or 5'-cyclopentadienyl)-methane (i) 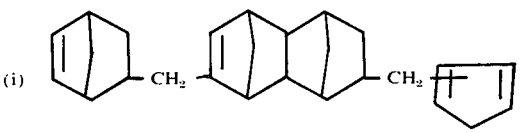 2-(2'-methylen-norborn -5'-enyl)-7-(4'' or 5''-methylene-cyclopentafienyl)-[bis-(1,4 - 5,8-endomethylene)-1,4,5,6,7,8,9,10-octahydro]-naphtalene Examples of these termonomers are the following ones:

 (l)    3-norborn-5-enyl-4', or 5'-cyclopentadiene

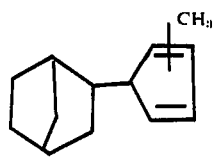 (m)    3-norborn-5-enyl-1'-(4' or 5' methyl)-cyclopentadiene

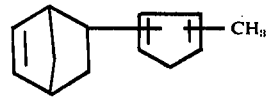 (n)    3-norborn-5-enyl-4' or 5'-(2' or 3' methyl) cyclopentadiene

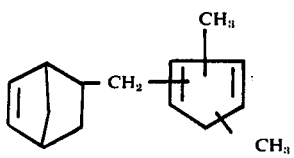    (2-norborn-5-enyl)-[4' or 5'-2',3' or 4'-dimethyl)-cyclopentadienyl]-methane

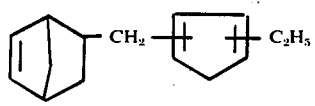    (2-norborn-5-enyl)-[4' or 5'-(2' or 3'-ethyl)-cyclopentadienyl]-methane

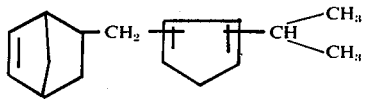    (2-norborn-5-enyl)-[4' or 5'-(2' or 3'-isopropyl)-cyclopentadienyl]-methane The amount of termonomer of the conventional type which may be usefully employed according to the invention ranges between 2 and 10%, preferably between 3 and 7 % by weight.

The amount of polycyclic polyene containing an endomethylene system with a double bond, orthocondensed with another hydrocarbon ring containing two conjugated double bonds may range from 0.1 to 2 %, preferably from 0.4 to 1.5 % by weight.

The catalyst systems useful for obtaining the inventive tetrapolymers may be constituted by a compound of a transition metal belonging to from the 4th to 8th groups of the periodic system and by reducing aluminium compounds having the general formula Al R $X_1X_2$ wherein R is selected from hydrocarbon radicals having 1 to 10 carbon atoms or hydrogen; $X_1$ and $X_2$, the same or different, are selected from the same group as R or may be halogens, secondary amine radicals, and moreover the aluminium compound may be a polyiminoalane as described in Italian Pat. No. 778,353 and corresponding U.S. Pat. No. 3,470,138.

The polymerization reaction may be carried out in the presence of an inert hydrocarbon solvent or in the same monomers (alpha-olefins) kept in the liquid state.

The catalyst may be performed in the presence or absence of one of the monomers or may be formed in "situ".

The temperatures are the ones usually employed in these reactions or may range from −60° to 100°C.

The pressures employed are the ones ranging from the one necessary for maintaining, at least partially, the monomers in the liquid phase and 100 armospheres, preferably from 1 to 80 atmospheres.

The inventive tetrapolymers may be mixed with diene rubbers having a high unsaturation degree and the so obtained mixtures may be vulcanized by employing the common vulcanization ingredients.

The respective amounts of tetrapolymer and diene rubber at high unsaturation may vary over a wide range, practically from 3 to 90 % of tetrapolymer.

These mixes show very good mechanical characteristics and after vulcanization may be advantageously utilized in the tire industry and as "general purpose" rubbers.

The following unrestrictive examples illustrate the invention without being limitative thereof.

EXAMPLE 1

Use was made of a 3,000 cm³ reactor provided with mechanical stirrer, thermometer, input and output gas pipes, previously dried at 110°C for some hours; therein were introduced, under an inert atmosphere, 2,500 cm³ of anhydrous toluene, distilled under a nitrogen atmosphere on LiH, which were, at the temperature of −10°C, saturated with a stream consisting of ethylene and propylene, in $C_3H_6/C_2H_4$ molar ratio of 1.8, having a total flow of 1100 Nl/1. Then, under a vigorous stirring, cm³ 3.0 of dicyclopentadiene (I)

(22.04 mmoles) and cm³ 0.3 of (2-norborn-5-enyl)-[1' or 4' or 5'-(1' or 2' or 3'-methyl)-cyclopentadienyl]-methane (II) (1.6 mmoles) were introduced into the reactor; then was introduced 0.72 mmole of vanadiumtriacetylacetonate and immediately the polymerization reaction was started by adding 7.20 mmoles of Al $(C_2H_5)_2$ Cl to the reaction medium, while the gaseous monomer stream was flowing. Over the reaction time, minute by minute, some amounts of (I) and (II) were introduced, dissolved in toluene, according to the following table, in order to ensure a constant concentration of the monomers in the polymerization solution:

| Reaction time (min) | (I) (cm³) | (II) (cm³) | Toluene solution of (I) and (II) (cm³) |
|---|---|---|---|
| 1 | 0.46 | 0.098 | 7.0 |
| 2 | 0.43 | 0.091 | 6.5 |
| 3 | 0.73 | 0.154 | 11.0 |
| 4 | 0.73 | 0.154 | 11.0 |
| 5 | 0.70 | 0.140 | 10.0 |
| 6 | 0.59 | 0.126 | 9.0 |
| 7 | 0.53 | 0.112 | 8.0 |
| 8 | 0.53 | 0.112 | 8.0 |
| 9 | 0.46 | 0.098 | 7.0 |
| 10 | 0.40 | 0.084 | 6.0 |
| 11 | 0.40 | 0.084 | 6.0 |
| 12 | 0.33 | 0.070 | 5.0 |
| 13 | 0.26 | 0.056 | 4.0 |
| 14 | 0.10 | 0.021 | 1.5 |
| Total | 6.65 | 1.400 | 100.0 |

The polymerization reaction was stopped after 20 feet by adding 10 cm³ of n-butyl alcohol; the polymer solution was made free from the catalyst residuals by washing with an excess of deionized water containing 0.1 % of emulsifying agent (Drezinate). The produced emulsion was broken by stabilizing the pH at 5 with $CH_3COOH$, the aqueous phase was separated and the polymer solution was treated with an excess of aqueous solution at pH = 5 consisting of disodium salt of ethylenediamino tetraacetic acid. It was again washed with deionized water to neutral pH.

The polymer produced was recoverd by coagulateing the toluene solution into an excess of acetone containing 0.1% of phenol antioxidant.

The polymer mass was again dissolved in n-heptane and the polymer was again precipitated as aforesaid.

After drying at room temperature under vacuum for 15 hours, g 103 of white polymer were obtained having the shape of an uncured elastomer which, at analysis, showed the following properties:

| | |
|---|---|
| % $C_2H_4$ by weight | = 56 |
| % (II) by weight determined by UV spectrophotometric analysis (at 254 mµ) | = 0.55 |
| % (I) by weight determined by iodometric way (IBr absorption) and considering the (II) amount | = 4.8 |
| [η] in toluene at 30°C | = 1.89 dl/g |
| Mooney viscosity $Ml_{1+4}$ (100°C) | = 85 |

The tetrapolymer nature of the produced elastomer was proved by the following fractionation carried out in an Kumagawa extractor by means of three different solvents:

| | % | [η] | % (I) | % (II) | % $C_2H_4$ |
|---|---|---|---|---|---|
| raw polymer | 100 | 1.89 | 4.8 | 0.55 | 56 |
| ether extract | 22.2 | 0.86 | 4.4 | 0.35 | n.d. |
| n-pentane extract | 33.3 | 1.90 | 5.1 | 0.60 | 56 |
| n-hexane extract | 44.4 | 1.78 | 4.6 | 0.60 | 57 |
| residual | 0 | — | — | — | — |

Two aliquots of the produced tetrapolymer were mixed with the vulcanization ingredients of the following table: the first mix contained only tetrapolymer, the second one was a mixture constituted by 75 % of tetrapolymer and 25 % of polyisoprene.

| Vulcanization mix | | |
|---|---|---|
| Polymer | 100 | parts |
| HAF black | 50 | " |
| naphtenic oil | 5 | " |
| Zn oxide | 5 | " |
| Stearil acid | 1 | " |
| Vulkacit CZC | 1 | " |
| Sulphur | 1.7 | " |
| AO-2246 | 1 | " |
| Vulcanization temperature = 145°C | | |

The results of the technological measurements performed on the homovulcanized samples were reported in section 1 (sample A) while the results of the co-vulcanization tests were reported in section 2 (sample A).

Both measurement series of sections 1 and 2 emphasize the plain superiority of the tetrapolymer properties with respect to a terpolymer (sample B) containing 5.0 % by weight of dicyclopentadiene, having $Ml_{1+4}$ (100°C) = 68 and $C_2H_4$ = 54 %.

Also the comparison between A of section 1 and 2 and a mixture at 50 % of terpolymers containing, in tato, 5.2 % of (I) and 0.72 % of (II) sample C) emphasized that the elastomer prepared according to this example is a true tetrapolymer and the properties shown by the product vulcanized thereby are not obtainable by mixing two terpolymers containing the termonomers which are contemporaneously present in tetrapolymer.

EXAMPLE 2

The preceding example was repeated but the reactor was initially fed with 2.0 cm³ of (I) (1.47 mmoles) and 0.5 cm³ of (II) (2.6 mmoles), the catalyst amount being unchanged. Then, over the polymerization time (20 minutes), complete 5.0 cm³ of (I) and complete 1.4 cm³ of (II) were introduced on regular time intervals.

The reaction gave rise to g 98 of elastomer having the following properties:

| | |
|---|---|
| % $C_2H_4$ | = 61 |
| % (II) | = 0.69 |
| % (I) | = 4.0 |
| [η] | = 1.80 dl/g |
| $ML_{1+4}$ (100°C) | = 82 |

The fractionation, carried out as described in the preceding example, gave the following results:

| | % | [η] | % (I) | % (II) | % $C_2H_4$ |
|---|---|---|---|---|---|
| raw polymer | 100 | 1.80 | 4.0 | 0.69 | 61 |
| ether extract | 15.6 | 0.86 | 3.9 | 0.40 | n.d. |
| n-pentane extract | 74.5 | 1.85 | 4.8 | 0.64 | 60 |
| n-hexane extract | 9.8 | 1.90 | n.d. | 0.86 | 62 |
| residual | 0 | — | — | — | — |

Two aliquots of tetrapolymer were mixed with the ingredients reported in the preceding example and subjected to vulcanization tests (sample D of section 1) and covulcanization tests with polyisoprene (sample D of section 2).

The collected results showed the superior properties of the tetrapolymer not only with to a to (I) base terpolymer (sample B of sections 1 and 2), but also with respect to a (II) base terpolymer (sample E) containing 0.72% of (II), $C_2H_4$ = 60.0% and $ML_{1+4}$ (100°C) = 70

EXAMPLE 3

By working with the apparatus and according to the general procedure of example 1, the reactor was fed with 0.5 cm$^3$ of (II) (2.6 mmoles) and 30 cm$^3$ (0.244 mmole) of 1,5-cyclooctadiene (III) together with 1.08 mmoles of vanadium triacetylacetonate and 10.8 mmoles of Al (C$_2$H$_5$)$_2$ Cl.

Then, over the polymerization interval, 0.3 cm$^3$ of (II) and 66 cm$^3$ of (III) were again introduced. After 20 minutes of polymerization and after having performed the washing and purification operations as described in example 1, a white elastomer was recovered which, after drying, weighed g 68 and, upon analysis, showed the following properties:

| | |
|---|---|
| % C$_2$H$_4$ | = 59 |
| % (II) | = 0.91 |
| % (III) | = 4.2 |
| [η] | = 1.99 dl/g |
| ML$_{1+4}$ (100°C) | = 98 |

Subjected to vulcanization and covulcanization according to the recipe of example 1, the obtained tetrapolymer gave the results reported, respectively, in sections 1 and 2 (sample F). The superior properties of the tetrapolymer were confirmed by comparing same with the results obtained from a cyclo-octadiene-1,5 base terpolymer, containing 5.1% of this diolefin, ML$_{1+4}$ (100°C)=75 and % C$_2$H$_4$=60 (sample G).

EXAMPLE 4

We operated according to example 1, by introducing into the reactor 0.6 cm$^3$ of (II) (3.1 mmoles) and 1.5 cm$^3$ (12.2 mmoles) of 2- ethyliden-norbor-5-ene (IV) together with 0.72 mmole of vanadium tri-acetylacetonate and 7.2 mmoles of Al Et$_2$ Cl.

The polymerization was carried out at 0°C and 1.5 cm$^3$ of (II) and 3.0 cm$^3$ of (IV) were again added at regular time intervals, over the reaction period.

After 20 minutes of polymerization, and after having performing the washing recoagulating and drying operations, g 96 of elastomer were recovered having the following properties:

| | |
|---|---|
| % C$_2$H$_4$ | = 63 |
| % (II) | = 0.75 |
| % (IV) | = 5.3 |
| [η] | = 1.97 dl/g |
| ML$_{1+4}$ (100°C) | = 90 |

After vulcanization (sample H, section 1) and covulcanization (section 2), a measurement set was obtained of the technological properties which confirmed the tetrapolymer superiority with respect to a terpolymer (sample K) containing 6.5 % of (IV), having ML$_{1+4}$ (100°C)=85 and prepared in the same conditions of sample H.

EXAMPLE 5

According to the procedure of example 1, 9.8 mmoles of exo-dicyclopentadiene (1.3 cm$^3$) and 0.5 cm$^3$ of (II) (2.6 mmoles) were introduced into the reactor, the catalyst amount being unchanged.

The polymerization was carried out at 0°C and, over the polymerization time, 3.3 cm$^3$ of exo-dicyclopentadiene and 1.2 cm$^3$ of (II) were added at regular time intervals.

After 20 minutes of reaction 91 g were obtained of dry elastomer showing the following proper ties:

| | |
|---|---|
| % C$_2$H$_4$ | = 62 |
| % (II) | = 0.65 |
| % exo-dicyclopentadiene (hexo- I) | = 4.3 |
| ML$_{1+4}$ (100°C) | = 78 |
| [η] | = 1.73 dl/g |

The elastomer was vulcanized and co-vulcanized according to the recipe of example 1 and the results were obtained as reported respectively in sections 1 and 2 (sample I); also the comparison with a terpolymer prepared under the same conditions as this example and containing 0.61 % of (II) (sample 4) emphasized the better properties of the tetrapolymer. A similar comparison, carried out on a mixture of terpolymers (sample M) containing 50 % of exo-dicyclopentadiene base terpolymer (totally 4.0% by weight) and 50 % (II) base terpolymer (totally 0.51% by weight) emphasized it that was not possible to obtain the properties of the cured products obtained from the tetrapolymer by mixing the terpolymers.

EXAMPLE 6

According to the procedure of example 1, 25.0 mmoles of 1,4-hexadiene (VI) (2.93 cm$^3$) and 2.6 mmoles of (II) (0.5 cm$^3$) were introduced into the reactor together with 0.73 mmole of vanadium triacetilacetonate and 7.2 mmoles of (C$_2$H$_5$)$_2$ AlCl.

By operating at $T = 10°C$, 50.0 mmoles of (VI) and 8.6 mmoles of (II) were added over the polymerization time. After 20 minutes of reaction 72 g of dry polymer were obtained showing the following properties.

| | |
|---|---|
| % C$_2$H$_4$ | = 63 |
| % (II) | = 0.68 |
| % (VI) | = 3.3 |
| [η] | = 1.77 dl/g |
| ML$_{1+4}$ (100°C) | = 79 |

The technological properties obtained from the vulcanized and co-vulcanized products are reported on sections 1 and 2 (sample N) and are advantageously compared with the properties of a terpolymer containing 4.2% of (VI) (sample 0).

EXAMPLE 7

According to the procedure of example 1, use was made of 50.0 mmoles of 4-vinyl-cyclohexene-1 (VII) (6.48 cm$^3$) and 2.6 mmoles of (II) (0.5 cm$^3$) together with 0.85 mmole of vanadium tri-acetylacetonate and 8.5 mmoles of (C$_2$H$_5$)$_2$ AlCl.

By operating at 0°C 100 mmoles of (VII) and 8.6 mmoles of (II) were again added over 30 minutes of polymerization.

At the end 89 g of dry polymer were recovered showing the following properties:

| | |
|---|---|
| % C$_2$H$_4$ | = 68 |
| % (II) | = 0.71 |
| % (VII) | = 3.9 |
| [η] | = 1.72 dl/g |
| ML$_{1+4}$ (100°C) | = 75 |

The technological properties of the vulcanized tetrapolymer and, above all, of the co-vulcanized ones were very good when compared with the properties obtained from mixtures containing polyisoprene and (II) or (VII) base terpolymers, and termonomer amounts close to the ones of the aforesaid tetrapolymer.

EXAMPLE 8

Example 6 was repeated but (VI) was replaced by the same amounts, as mmoles, of 6-methyl-4,5,8,9--

-tetrahydroindene (VIII) and (II). Over 30 minutes of reaction 81 g of dry polymer were obtained showing the following properties:

| | |
|---|---|
| % $C_2H_4$ | = 59 |
| % (II) | = 0.71 |
| % (VIII) | = 4.6 |
| [η] | = 1.65 dl/g |
| $ML_{1+4}$ (100°C) | = 69 |

The produced tetrapolymer showed a good behaviour to vulcanization and co-vulcanization: such a behaviour was emphasized by comparison with the properties of the vulcanized and unvulcanized products obtained from terpolymers containing only (II) or (VIII).

EXAMPLE 9

The example 1 was repeated but (II) was replaced by 4-cyclohexenyl-[1' or 4' or 5'-(1' or 2' or 3'-methyl)-cyclopentadienyl]-methane (IX): 16.0 mmoles were at first introduced into the reactor while other 75.0 mmoles were added over the polymerization time (20 minutes) together with 45.0 mmoles of "endo"-dicyclopentadiene (I).

At the end 65 g of dry elastomer were obtained showing the following properties:

| | |
|---|---|
| % $C_2H_4$ | = 67 |
| % (I) | = 5.1 |
| % (IX) | = 0.7 |
| [η] | = 1.81 dl/g |
| $ML_{1+4}$ (100°C) | = 82 |

The produced tetrapolymer showed a good behaviour with regard to the homo - and co-vulcanization on the basis of comparison with the properties of the vulcanized products obtained from terpolymers containing only (I) or only (IX).

EXAMPLE 10

The example 1 was repeated but (II) was replaced by the higher molecular weight compound, i.e. (2-norborn-5-enyl)-[1' or 4' or 5'-(dimethyl)-cyclopentadienyl]-methane (X).

By using same amounts of catalyst and monomers we obtained, at −10°C and over 20 minutes, a yield of dry polymer equal to 117 g showing the following properties:

| | |
|---|---|
| % $C_2H_4$ | = 55 |
| % (X) | = 0.61 |
| % (I) | = 4.3 |
| [η] | = 1.83 dl/g |
| $ML_{1+4}$ (100°C) | = 80 |

The properties of the vulcanized and co-vulcanized products obtained from the tetrapolymer prepared according to this example were quite similar to the ones of sample A reported on sections 1 and 2.

EXAMPLE 11

The example 1 was repeated but (I) was replaced by a mixture of "exo" and "endo" isomers of dicyclopentadiene, containing 70% of "exo"-derivative, and the other features being unchanged.

Over 20 minutes, 97 g. of dry elastomer were obtained which, upon analysis, showed the following properties:

| | |
|---|---|
| % by weight of $C_2H_4$ | = 58 |
| % (II) | = 0.66 |
| % "endo" and "exo"-dicyclopentadiene | = 5.9 |
| [η] | = 1.76 dl/g |
| $ML_{1+4}$ (100°C) | = 88 |

The behaviour of the elastomer obtained after vulcanization according to the recipe of example 1 was very similar to the one of sample D reported on sections 1 and 2.

EXAMPLE 12

By operating according to example 1 and using the same reagent amounts, but with the compound (I) replaced by a mixture of products obtained from the condensation of butadiene with cyclopentadiene at the temperature of 170°C, and consisting of 8% "endo"-dicyclopentadiene, 10% 2-vinyl-5-norbornene, 28% 4,5,8,9-tetrahydroindene and 54% 4-vinyl-cyclohexane-1, g 88 of dry elastomer were obtained over 20 minutes of polymerization showing the following properties:

| | |
|---|---|
| % by weight of $C_2H_4$ | = 59 |
| % (II) | = 0.63 |
| % dimers of butadiene, cyclopentadiene and mixed adducts | = 3.5 |
| [η] | = 1.68 dl/g |
| $ML_{1+4}$ (100°C) | = 65 |

The behaviour of the elastomer after vulcanization and co-vulcanization was satisfactory and at any rate better than the vulcanized products obtained from the polymers obtained from only (II) or the mixture of the condensation products of butadiene and cyclopentadiene.

SECTION 1

Technological properties of homo-vulcanized products obtained from tetrapolymers and terpolymers described in Examples 1–6 (1)

| Vulcanization time (min.) Sample | Ref. ex. | Modulus 200% (kg/cm²) | | | Tensile strength (kg/cm²) | | | Elongation at Break % | | | Tensile set % | | | Heat development °C | | |
|---|---|---|---|---|---|---|---|---|---|---|---|---|---|---|---|---|
| | | 15 | 30 | 60 | 15 | 30 | 60 | 15 | 30 | 60 | 15 | 30 | 60 | 15 | 30 | 60 |
| A | 1 | 36 | 41 | 48 | 128 | 221 | 277 | 490 | 450 | 470 | 38 | 29 | 21 | n.d. | 51 | 41 |
| B | 1 | 18 | 25 | 36 | 101 | 200 | 210 | 580 | 560 | 550 | 50 | 40 | 35 | n.d. | n.d. | n.d. |
| C | 1 | 18 | 30 | 39 | 110 | 190 | 205 | 530 | 510 | 505 | 46 | 41 | 31 | n.d. | n.d. | n.d. |
| D | 2 | 46 | 55 | 75 | 192 | 273 | 315 | 500 | 485 | 465 | 29 | 21 | 17 | n.d. | 40 | 34 |
| E | 2 | 36 | 43 | 49 | 127 | 193 | 216 | 495 | 480 | 495 | 46 | 38 | 31 | n.d. | 55 | 48 |
| F | 3 | 45 | 55 | 64 | 179 | 244 | 286 | 510 | 490 | 450 | 29 | 21 | 19 | n.d. | 45 | 45 |
| G | 3 | 20 | 24 | 45 | 102 | 250 | 255 | 540 | 560 | 550 | 45 | 35 | 30 | n.d. | n.d. | 48 |
| H | 4 | 52 | 60 | 80 | 195 | 260 | 320 | 470 | 465 | 450 | 25 | 20 | 14 | 45 | 37 | 30 |
| K | 4 | 22 | 29 | 46 | 135 | 224 | 298 | 530 | 550 | 540 | 45 | 42 | 41 | n.d. | 49 | 46 |
| I | 5 | 50 | 58 | 78 | 170 | 240 | 290 | 460 | 450 | 430 | 24 | 18 | 13 | 48 | 35 | 31 |
| L | 5 | 35 | 42 | 47 | 120 | 170 | 201 | 460 | 440 | 420 | 48 | 35 | 29 | n.d. | 57 | 46 |
| M | 5 | 29 | 34 | 41 | 120 | 165 | 205 | 540 | 565 | 525 | 44 | 38 | 32 | n.d. | n.d. | 52 |
| N | 6 | 47 | 57 | 69 | 160 | 215 | 275 | 475 | 450 | 430 | 30 | 22 | 20 | n.d. | 45 | 43 |
| O | 6 | 26 | 32 | 40 | 130 | 175 | 208 | 560 | 545 | 530 | 50 | 37 | 35 | n.d. | 57 | 45 |

(1) The vulcanization recipe is reported in Example 1
NOTE: n.d. = which cannot be determined because of the specimen breaking during the test.

SECTION 2

Technological properties of the co-vulcanized products obtained from 75 : 25 mixtures of tetrapolymers (or terpolymers) described in examples 1–6 (1)

| Vulcanization time (min.) Sample | Ref. ex. | Modulus 200% (kg/cm²) | | | Tensile strength (kg/cm²) | | | Elongation at break % | | | Tensile set % | | | Heat development °C | | |
|---|---|---|---|---|---|---|---|---|---|---|---|---|---|---|---|---|
| | | 15 | 30 | 60 | 15 | 30 | 60 | 15 | 30 | 60 | 15 | 30 | 60 | 15 | 30 | 60 |
| A | 1 | 32 | 36 | 46 | 95 | 128 | 168 | 635 | 520 | 560 | 38 | 29 | 24 | n.d. | n.d. | 43 |
| B | 1 | 13 | 22 | 25 | 33 | 48 | 60 | 970 | 790 | 650 | 75 | 45 | 45 | n.d. | n.d. | n.d. |
| C | 1 | 27 | 31 | 37 | 51 | 87 | 113 | 760 | 720 | 630 | 60 | 39 | 34 | n.d. | n.d. | 53 |
| D | 2 | 36 | 52 | 65 | 149 | 190 | 220 | 580 | 555 | 490 | 39 | 31 | 27 | n.d. | 50 | 45 |
| E | 2 | 24 | 40 | 42 | 96 | 131 | 166 | 620 | 585 | 590 | 42 | 33 | 25 | n.d. | 57 | 48 |
| F | 3 | 38 | 54 | 62 | 164 | 216 | 230 | 525 | 500 | 485 | 29 | 25 | 21 | 57 | 48 | 40 |
| G | 3 | 15 | 23 | 30 | 38 | 50 | 58 | 900 | 805 | 620 | 70 | 40 | 39 | n.d. | n.d. | 50 |
| H | 4 | 40 | 54 | 70 | 155 | 215 | 240 | 540 | 530 | 465 | 27 | 18 | 16 | 53 | 45 | 35 |
| K | 4 | 16 | 27 | 28 | 36 | 54 | 63 | 950 | 790 | 600 | 69 | 36 | 21 | n.d. | n.d. | n.d. |
| I | 5 | 42 | 57 | 72 | 140 | 220 | 218 | 520 | 490 | 470 | 28 | 19 | 15 | 55 | 43 | 32 |
| L | 5 | 26 | 40 | 44 | 90 | 120 | 170 | 600 | 550 | 545 | 50 | 41 | 33 | n.d. | 56 | 45 |
| M | 5 | 19 | 32 | 39 | 48 | 80 | 107 | 870 | 780 | 650 | 65 | 55 | 38 | n.d. | n.d. | 53 |
| N | 6 | 36 | 49 | 61 | 117 | 195 | 208 | 580 | 510 | 485 | 48 | 44 | 33 | n.d. | 44 | 36 |
| O | 6 | 26 | 31 | 37 | 39 | 77 | 103 | 710 | 605 | 550 | 53 | 45 | 37 | n.d. | n.d. | n.d. |

(1) The vulcanization recipe is reported in Example 1
NOTE: n.d. = which cannot be determined

What we claim is:

1. Vulcanizable olefin tetrapolymers comprising ethylene, an alpha-olefin having at least three carbon atoms, at least one conventional termonomer selected from the group consisting of exo- and endo-dicyclopentadiene, alkenyl- and cyclo-alkenyl-norbornenes, alkyliden-norbornenes, alkyl-norbornadienes, tetrahydroindene and alkyl derivatives thereof, methylendomethylene-hexahydronaphthalene, dicycloheptadiene, linear and branched non-conjugated dienes, cyclic dienes and vinyl substituted cyclic hydrocarbons, and a minor amount of a polycyclic polyene having the formula A — $(CH_2)_n$ — B wherein A is a radical consisting of or containing at least one cyclohexene ring or at least one cyclohexene ring with an endomethylene bridge, B is a cyclopentadiene or cyclohexadiene radical and n is a number ranging from 0 to 5.

2. Tetrapolymers according to claim 1 wherein the radical A is selected from

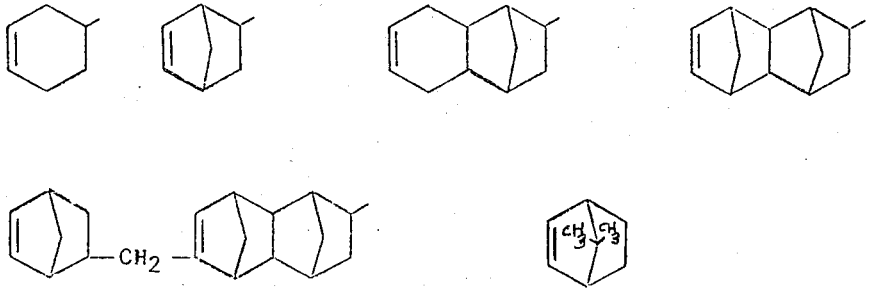

and alkyl substituted such radicals.

3. Tetrapolymers according to claim 1, wherein the radical B is selected from

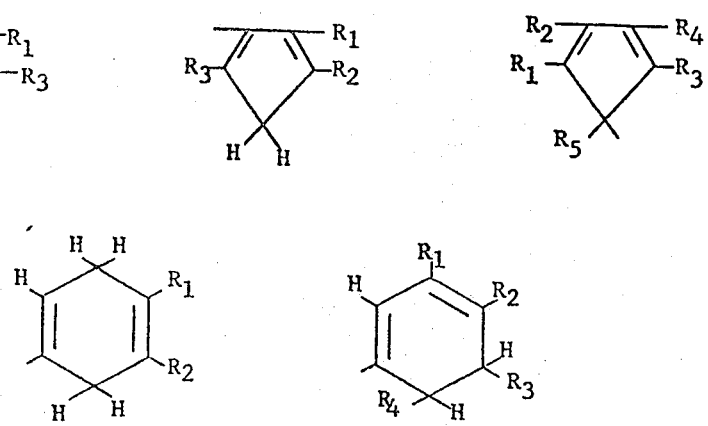

wherein $R_1$ $R_2$ $R_3$ $R_4$ and $R_5$ may be hydrogen or alkyl radicals having from 1 to 5 carbon atoms.

4. Tetrapolymers according to claim 1 wherein the amount of said polycyclic polyene in the elastomer ranges from 0.1 to 2% by weight.

5. Tetrapolymers according to claim 1 wherein the amount of said conventional termonomer ranges from 2 to 10% by weight.

6. Tetrapolymers according to claim 1, wherein said alpha-olefin is propylene.

7. Tetrapolymers according to claim 1, wherein said conventional termonomer is selected from endo- and exo- dicyclopentadiene, vinylnorbornene, 1,4-hexadiene, 4-vinylcyclohexene, cyclooctadiene, ethylidenenorbornene, methyltetrahydroindene.

8. Manufactured articles obtained by vulcanizing the tetrapolymers according to claim 1.

* * * * *

UNITED STATES PATENT AND TRADEMARK OFFICE
CERTIFICATE OF CORRECTION

PATENT NO. : 3,903,061
DATED : September 2, 1975
INVENTOR(S) : Sebastiano Cesca, et al It is certified that error appears in the above-identified patent and that said Letters Patent are hereby corrected as shown below:

Col. 1, line 37, correct "paint" to read -- point --, line 54, before "conventional" change "the" to read -- a --.

Col. 2, line 40, change "exo" to read -- exo- --.

Cols. 3 and 4, examples "(b)" through "(h)" correct the first ring in each formula to read -- 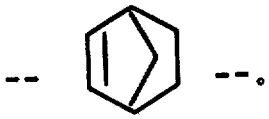 --.

Col. 7, lines 31 and 32, correct "20 feet" to read -- 20' --.

Col. 8, line 29, correct "tato" to read -- toto --, line 66, after "with" insert -- regard -- and after "a" delete "to", line 69, after "70" insert a period -- . --.

Signed and Sealed this fourth Day of May 1976

[SEAL]

Attest:

RUTH C. MASON
Attesting Officer

C. MARSHALL DANN
Commissioner of Patents and Trademarks